United States Patent
Hutton

(10) Patent No.: US 7,649,476 B2
(45) Date of Patent: *Jan. 19, 2010

(54) SYSTEM AND METHOD FOR IDENTIFYING AN AIRCRAFT DURING APPROACH TO A STOPPING POSITION

(75) Inventor: Neil Hutton, Ottawa (CA)

(73) Assignee: DEW Engineering and Development ULC, Ottawa, Ontario (CA)

( * ) Notice: Subject to any disclaimer, the term of this patent is extended or adjusted under 35 U.S.C. 154(b) by 348 days.

This patent is subject to a terminal disclaimer.

(21) Appl. No.: 11/727,009

(22) Filed: Mar. 23, 2007

(65) Prior Publication Data

US 2008/0231472 A1 Sep. 25, 2008

(51) Int. Cl.
*G08B 21/00* (2006.01)
(52) U.S. Cl. .................................. 340/958; 244/114 R
(58) Field of Classification Search ................ 340/958; 701/3, 120–121; 244/75 R, 76 R, 114 R
See application file for complete search history.

(56) References Cited

U.S. PATENT DOCUMENTS

| | | | |
|---|---|---|---|
| 5,226,204 A * | 7/1993 | Schoenberger et al. ....... 14/71.5 |
| 6,637,063 B1 | 10/2003 | Hutton et al. |
| 6,742,210 B2 | 6/2004 | Hutton et al. |
| 6,757,927 B2 | 7/2004 | Hutton et al. |
| 6,907,635 B2 | 6/2005 | Hutton et al. |
| 7,030,354 B2 | 4/2006 | Oki et al. |
| 7,093,314 B2 | 8/2006 | Hutton et al. |
| 2003/0184449 A1* | 10/2003 | Baumgartner et al. ....... 340/958 |
| 2004/0090348 A1* | 5/2004 | Hutton ....................... 340/958 |
| 2006/0163432 A1 | 7/2006 | McCoskey et al. |

FOREIGN PATENT DOCUMENTS

| | | |
|---|---|---|
| EP | 0803435 A1 | 10/1997 |
| WO | WO 96/08411 A1 | 3/1996 |
| WO | WO 03/064255 A1 | 8/2003 |
| WO | WO 03/072435 A1 | 9/2003 |

OTHER PUBLICATIONS

U.S. Appl. No. 11/594,880, Hutton.
U.S. Appl. No. 11/727,010, Hutton.
U.S. Appl. No. 12/000,700, Hutton.
U.S. Appl. No. 11/157,934, Hutton.
U.S. Appl. No. 11/157,938, Hutton.
U.S. Appl. No. 11/149,401, Hutton.
U.S. Appl. No. 11/155,502, Hutton.

* cited by examiner

*Primary Examiner*—Brent Swarthout
(74) *Attorney, Agent, or Firm*—Freedman & Associates

(57) ABSTRACT

A method for guiding an aircraft toward a stopping position within an aircraft stand of an airport comprises using a visual docking guidance system (VDGS) associated with the aircraft stand for displaying first instructions for guiding the aircraft toward the stopping position. The first instructions are based on an initial determination of the aircraft-type and on first sensed positional information of the aircraft. Aircraft-type data that is stored in a radio frequency identification (RFID) tag carried by the aircraft is then read. Using the VDGS, second instructions are displayed for guiding the aircraft toward the stopping position based on the aircraft-type data and based on second sensed positional information of the aircraft.

24 Claims, 5 Drawing Sheets

SYSTEM AND METHOD FOR IDENTIFYING AN AIRCRAFT DURING APPROACH TO A STOPPING POSITION

FIELD OF THE INVENTION

The instant invention relates generally to guidance docking systems for aircraft, and more particularly to a radio frequency identification (RFID) tag-based system and method for identifying an aircraft during approach to a stopping position.

BACKGROUND

In order to make aircraft passengers comfortable, and in order to transport them between an airport terminal building and an aircraft in such a way that they are protected from the weather and from other environmental influences, passenger boarding bridges are used which are telescopically extensible and the height of which is adjustable. For instance, an apron drive bridge includes a plurality of adjustable modules, including: a rotunda, a telescopic tunnel, a bubble section, a cab, and elevating columns with wheel carriage. Other common types of passenger boarding bridges include radial drive bridges and over-the-wing (OTW) bridges.

Historically, the procedure for guiding an aircraft to a stopping position adjacent to the passenger boarding bridge has been time consuming and labor intensive. In general, the pilot taxis the aircraft along a lead-in line to the stopping position. Typically, the lead-in line is a physical marker that is painted onto the apron surface, and is used for guiding the aircraft along a predetermined path to the stopping position. Additional markings in the form of stop lines, different ones for different types of aircraft, are provided at predetermined positions along the lead-in line. Thus, when the nose gear of a particular type of aircraft stops precisely at the stop line for that type of aircraft, then the aircraft is known to be at its stopping position. Of course, the pilot's view of the apron surface from the cockpit of an aircraft is limited. This is particularly true for larger aircraft, such as for instance a Boeing 747-X00. Typically, in order to follow the lead-in line the pilot has relied upon instructions that are provided by a human ground marshal or guide man, together with up to two "wing walkers". Optionally, stop bars are located on a pole that is fixedly mounted to the ground surface, including appropriate stop bars for each type of aircraft that uses the gate. Alternatively, a tractor or tug is used to tow the aircraft along the lead-in line to its stopping position.

More recently, sophisticated Visual Docking Guidance Systems have been developed to perform the function of the human ground marshal or guide man and wing walkers. In particular, a Visual Docking Guidance System (VDGS) senses the aircraft as it approaches the stopping position and provides instructions to the pilot via an electronic display device. The electronic display device is mounted at a location that makes it highly visible to the pilot when viewed from the cockpit of an aircraft. Typically, the instructions include a combination of alphanumeric characters and symbols, which the pilot uses to guide the aircraft precisely to the stopping position for the particular type of aircraft. The high capital cost of the VDGS is offset by reduced labor costs and the efficiency that results from stopping the aircraft as precisely as is possible under the guidance of a human ground marshal or guide man.

One common feature of the types of VDGS that are in use today is that a sensor is provided at a position that is typically approximately aligned with the lead in-line. Typical sensors include digital still or video cameras, laser imaging devices, or infrared sensors. The sensor is used to scan an area that is adjacent to the passenger boarding bridge, so as to "look" for an approaching aircraft. Based on sensed features of the approaching aircraft, the VDGS either identifies the aircraft type or merely confirms that the aircraft type matches information that was provided previously. Once the aircraft type is confirmed, and thus the relevant stopping position is known, the sensor continues to "watch" the aircraft as it approaches the stopping position, and provides instructions to the pilot for guiding the aircraft to the stopping position. A combination of a sophisticated imaging system and a complex image data processing algorithm is required in order to ensure that the aircraft type is identified correctly, and that once identified, the trajectory of the aircraft is monitored in real time and with sufficient accuracy to enable proper parking of the aircraft. Of course, from time to time the aircraft type will be identified incorrectly, or the identified type will not agree with the information that was provided previously. In those cases, the pilot must rely upon one of the more traditional procedures for parking the aircraft discussed supra. In addition, unfavorable environmental conditions such as fog, heavy rain, snow etc. may render the imager of the VDGS ineffective. Under such unfavorable conditions, the pilot must once again rely upon one of the more traditional procedures for parking the aircraft discussed supra.

Accordingly, there exists an unfulfilled need for a system and method for identifying and guiding an aircraft to a stopping position. There furthermore exists an unfulfilled need for such a system and method, which provides reliable operation even under unfavorable environmental conditions such as fog, heavy rain, snow etc., and that reduces the potential for incorrectly identifying the aircraft type to be parked.

SUMMARY OF EMBODIMENTS OF THE INVENTION

In accordance with an aspect of the instant invention there is provided a method for guiding an aircraft toward a stopping position within an aircraft stand of an airport, there being associated with the aircraft stand a passenger boarding bridge for supporting passenger loading and unloading operations and a visual docking guidance system (VDGS) for displaying instructions for guiding the aircraft toward a stopping position, the method comprising: using the VDGS, displaying first instructions for guiding the aircraft toward a stopping position based on an initial determination of the aircraft-type and based on first sensed positional information of the aircraft; reading aircraft-type data that is stored in a radio frequency identification (RFID) tag carried by the aircraft; using the VDGS, displaying second instructions for guiding the aircraft toward a stopping position based on the aircraft-type data and based on second sensed positional information of the aircraft.

In accordance with another aspect of the instant invention there is provided a method for guiding an aircraft toward a stopping position within an aircraft stand of an airport, there being associated with the aircraft stand a passenger boarding bridge for supporting passenger loading and unloading operations and a visual docking guidance system (VDGS) for displaying instructions for guiding the aircraft toward a stopping position, the method comprising: sensing an aircraft during movement of the aircraft along an initial trajectory toward a stopping position within the aircraft stand; determining an initial aircraft-type of the aircraft; displaying first instructions for guiding the aircraft from a current position thereof to an interrogation region, the interrogation region being between the current position of the aircraft and a predetermined stopping position for the initial aircraft-type; when the aircraft is within the interrogation region, interrogating a radio frequency identification (RFID) tag that is carried by the aircraft, to determine a final aircraft-type of the aircraft based on aircraft-type data that is stored in the RFID tag; and, when the final aircraft-type is different than the initial aircraft type and a predetermined stopping position for the final aircraft-type is different than the predetermined stopping position for the initial aircraft-type, displaying second instructions for guiding the aircraft from the interrogation region to the predetermined stopping position for the final aircraft-type.

In accordance with another aspect of the instant invention there is provided a method for guiding an aircraft toward a stopping position within an aircraft stand of an airport, there being associated with the aircraft stand a passenger boarding bridge for supporting passenger loading and unloading operations and a visual docking guidance system (VDGS) for displaying instructions for guiding the aircraft toward a stopping position, the method comprising: providing a radio frequency identification (RFID) tag reader proximate an aircraft engaging end of the passenger boarding bridge; pre-positioning the passenger boarding bridge to an interrogation position, so as to define an interrogation region along a portion of an aircraft approach route to the stopping position; determining an initial aircraft-type of the aircraft; using the VDGS, displaying first instructions for guiding the aircraft into the interrogation region along a trajectory that is directed generally toward the aircraft stand, the trajectory selected in dependence upon the determined initial aircraft-type of the aircraft; subsequent to the aircraft entering the interrogation region, interrogating a RFID tag that is carried by the aircraft so as to obtain aircraft-type data that is stored in the RFID tag; determining a final type of the aircraft based on the aircraft-type data; and, using the VDGS, displaying second instructions for guiding the aircraft from the interrogation region to a pre-determined stopping position for the determined final type of the aircraft.

BRIEF DESCRIPTION OF THE DRAWINGS

Exemplary embodiments of the invention will now be described in conjunction with the following drawings, in which similar reference numbers designate similar items.

DESCRIPTION OF EMBODIMENTS OF THE INVENTION

Figure 1:
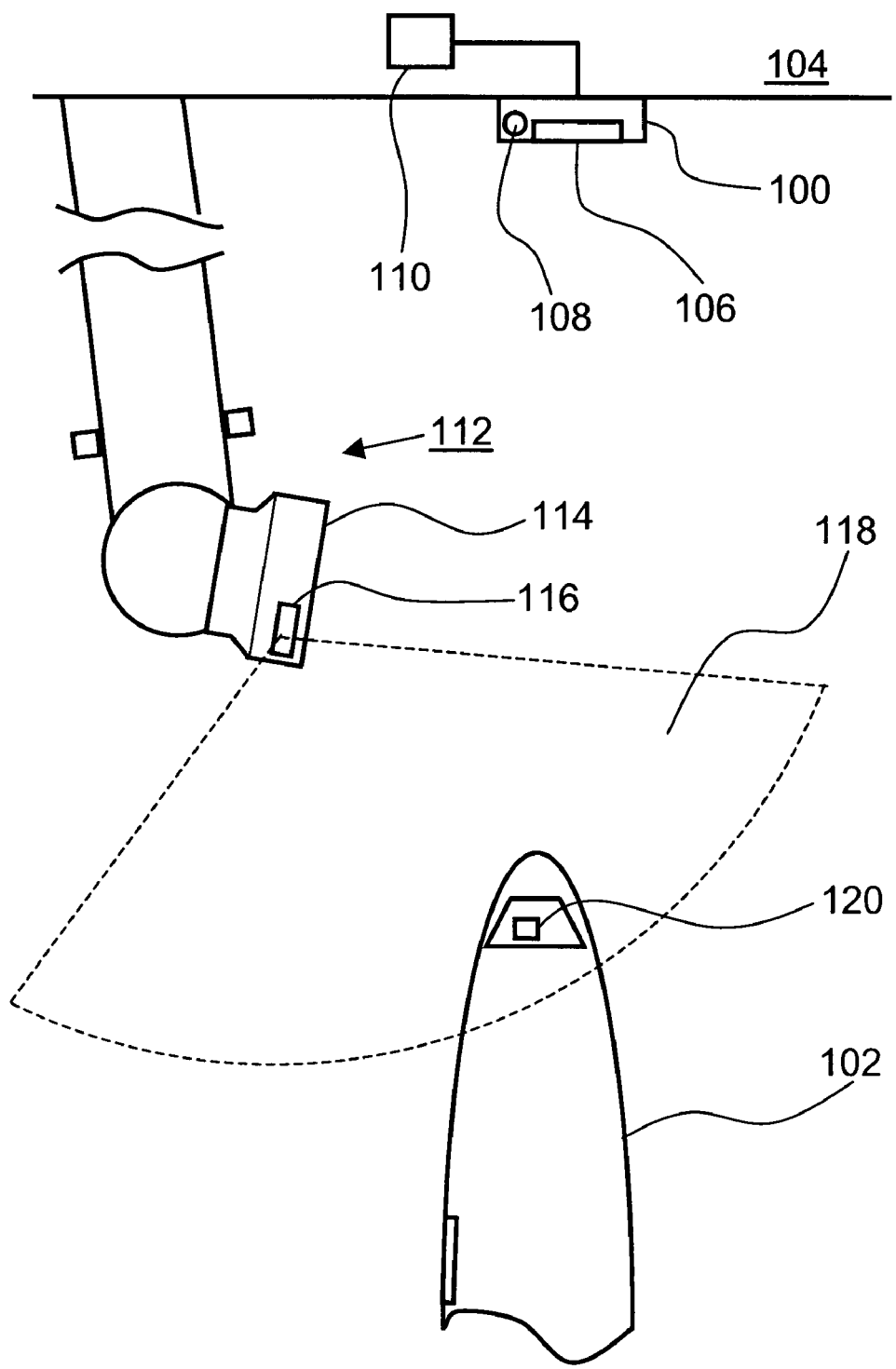
FIG. 1 is a simplified diagram showing a system that is suitable for implementing a method according to one of the embodiment of the instant invention.

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

In recent years there has been a trend toward decreasing aircraft turn-around times, particularly on scheduled domestic routes. Economics is the primary force that has been driving this trend; stated simply the aircraft does not create profit for the airline as long as it is on the ground. Accordingly, new ways have been developed for guiding the aircraft into the aircraft stand and for aligning a passenger boarding bridge with the doorway of the aircraft in as short a period of time as is possible. Typically, automated systems and methods have been implemented to speed up the process of unloading and loading passengers, while at the same time reducing the number of ramp personnel that are involved in the process. One problem that is associated with automated systems relates to reliability of operation and the costs that result when unexpected failures occur. For instance a modern visual docking guidance system (VDGS) in use at an airport replaces the aircraft guiding duties of up to three ramp personnel including a human ground marshal, or guide man, and two wing walkers. The ability of the VDGS to guide an aircraft into the aircraft stand relies on an accurate initial determination of the aircraft-type being made. When an accurate initial determination of the aircraft-type is not achieved, a delay occurs and in some cases it is necessary to proceed in a manual fashion. Such delays not only increase costs, but also inconvenience passengers and may result in connecting flights being missed, etc.

The initial determination of the aircraft-type is performed in one of several different ways, depending on the type of the VDGS that is in place at a particular aircraft stand. In one approach a sensor is used to sense features of the aircraft as it approaches the aircraft stand. The features are for being compared to a database of stored template data relating to different known aircraft-types. Unfortunately, matching algorithms are imperfect and there is a risk that one aircraft-type will be mistaken for another similar aircraft-type. Furthermore, adverse weather conditions such as fog, heavy rain and snow limit the effective range of some sensors, particularly imaging devices such as digital still cameras and digital video cameras.

According to another approach the VDGS receives data relating to the type of an aircraft that is assigned to the aircraft stand. For instance the VDGS is in communication with a database of the airport, the database including aircraft gate assignment information and aircraft-type information. Unfortunately, aircraft gate assignments are made in advance and last minute changes may not be reflected in the airport database. Furthermore, an airline may change the type of aircraft being used for a particular flight if for instance the originally scheduled equipment requires unforeseen maintenance, or is unexpectedly delayed due to weather, etc. In such instances the type of aircraft that actually arrives at the aircraft stand is not the same as the expected aircraft-type.

According to yet another approach, the VDGS receives aircraft-type data that is provided by a human operator. For instance an airline employee uses a data entry device that is located within the gate area to provide the aircraft-type data to the VDGS. Problems associated with last minute gate assignment changes are compensated, since the employee observes the aircraft as it approaches the stand and may update any information that was provided previously. However, human error is likely to result in misidentification of aircraft-type. It is possible for the human operator to make an erroneous identification of the aircraft-type, or to simply enter the wrong type of aircraft using the data entry device. Furthermore, poor lighting conditions or adverse weather conditions affect the ability of the human operator to correctly identify the aircraft-type from a distance.

After initial determination of the aircraft-type has been made according to one of the above-mentioned approaches, the VDGS is used to display to a pilot of the aircraft instructions for guiding the aircraft toward a predetermined stopping position for the determined aircraft-type. Typical instructions include turn arrows and distance indicators, a "stop" indication and a "too far" indication. In addition, typically the aircraft-type as determined according to one of the above-mentioned approaches is displayed. Of course, the pilot of an aircraft is very well aware of the actual aircraft-type and is not inclined to follow the VDGS instructions if the displayed aircraft-type is different than the actual aircraft-type. When the displayed aircraft-type is incorrect, the only option that is available to the pilot is to hold position and wait for ramp personnel to be dispatched to complete the docking process manually. Since it has now taken longer than expected to dock the aircraft, either the outbound flight is delayed or all of the aircraft servicing tasks must be performed more quickly than usual in order to compensate for late arrival of the aircraft to the aircraft stand.

Referring now to FIG. 1, shown is a schematic illustration of a system that is suitable for implementing a method according to one of the embodiments of the instant invention. A visual guidance docking system 100 is mounted at a location that is within the field of view of a pilot aboard an aircraft 102. For instance, the VDGS 100 is fixedly mounted to an outside wall surface of an airport terminal building 104, at a location that is approximately aligned with a not illustrated aircraft lead-in line of the aircraft stand. The VDGS 100 includes a display portion 106 for displaying instructions to the pilot aboard aircraft 102 and a sensor 108 for sensing aircraft 102 during approach thereof toward the aircraft stand. By way of several non-limiting examples, the sensor 108 is one of a laser range finder, an infrared sensor, a digital still camera and a digital video camera. The VDGS 100 is in communication with a database 110 of the terminal building 104. The database 110 optionally includes stored template data relating to different known aircraft-types and/or aircraft gate assignment information including aircraft-type information for each assigned aircraft. By way of a specific and non-limiting example, sensor 108 is used to sense features of the aircraft 102 during approach thereof to the aircraft stand. Data that is indicative of the sensed features is provided to a not illustrated processor of the VDGS 100. Template data relating to different known aircraft-types is retrieved from database 110, and the not illustrated processor performs a matching operation to match the data that is indicative of the sensed features with the retrieved template data. Based upon a result of the matching operation, an initial determination of the aircraft-type of aircraft 102 is made.

Referring still to FIG. 1, a passenger boarding bridge 112 is shown extending between terminal building 104 and an aircraft-engaging end including a pivotable cabin 114. Disposed proximate the aircraft-engaging end, such as for instance within cabin 114, is a radio frequency identification (RFID) tag reader 116. The RFID tag reader 116 includes not illustrated antenna, transceiver and decoder components for receiving radio frequency (RF) signals that originate within an interrogation region 118 adjacent to the aircraft engaging end of passenger boarding bridge 112. An RFID tag 120 is disposed aboard aircraft 102. The RFID tag 120 includes an integrated circuit for storing at least information relating to the aircraft-type of aircraft 102, and an antenna element for use in transmitting an RF signal that is encoded with the aircraft-type information. The RFID tag 120 preferably is disposed proximate the nose end of aircraft 102, such as for instance mounted to the cockpit windscreen or mounted to a surface of the nose landing-gear. Positioning the RFID tag 120 close to the nose of the aircraft 102 ensures that the RFID tag enters the interrogation region as soon as possible during the aircraft approach to the aircraft stand. This allows the RFID tag 120 to be interrogated while the aircraft is as far away as possible from the stopping position. The specific configuration and operating principles of RFID systems are well known, and the details mostly are omitted from this discussion in the interest of clarity.

Figure 2:
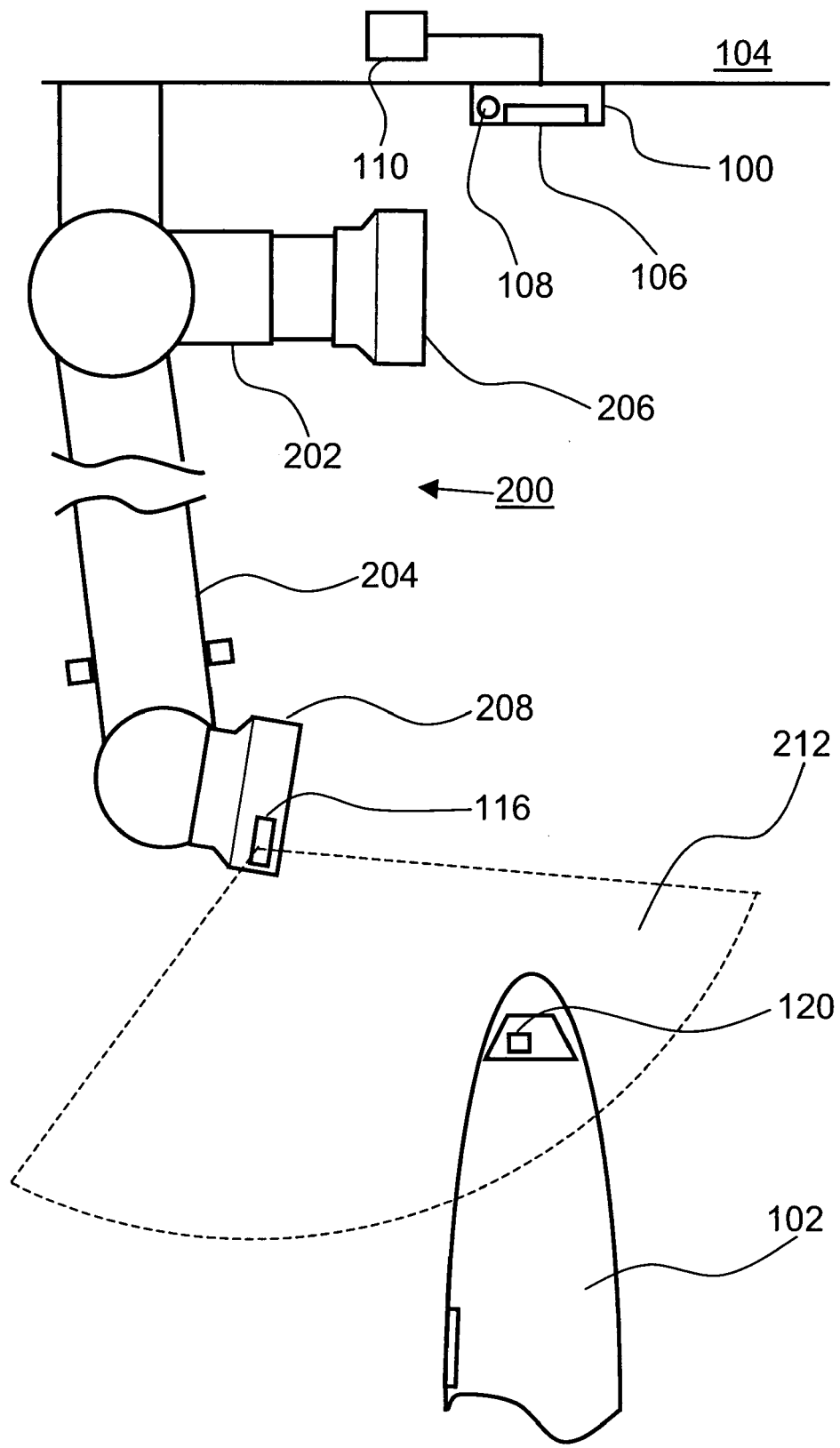
FIG. 2 is a simplified diagram showing another system that is suitable for implementing a method according to one of the embodiment of the instant invention.

Referring now to FIG. 2, shown is another system that is suitable for implementing a method according to one of the embodiments of the instant invention. A visual docking guidance system 100 is mounted at a location that is within the field of view of a pilot aboard an aircraft 102. For instance, the VDGS 100 is fixedly mounted to an outside wall surface of an airport terminal building 104, at a location that is approximately aligned with a not illustrated aircraft lead-in line of the aircraft stand. The VDGS 100 includes a display portion 106 for displaying instructions to the pilot aboard aircraft 102 and a sensor 108 for sensing aircraft 102 during approach thereof toward the aircraft stand. By way of several non-limiting examples, the sensor 108 is one of a laser range finder, an infrared sensor, a digital still camera and a digital video camera. The VDGS 100 is in communication with a database 110 of the terminal building 104. The database 110 optionally includes stored template data relating to different known aircraft-types and/or aircraft gate assignment information including aircraft-type information for each assigned aircraft. By way of a specific and non-limiting example, sensor 108 is used to sense features of the aircraft 102 during approach thereof to the aircraft stand. Data that is indicative of the sensed features is provided to a not illustrated processor of the VDGS 100. Template data relating to different known aircraft-types is retrieved from database 110, and the not illustrated processor performs a matching operation to match the data that is indicative of the sensed features with the retrieved template data. Based upon a result of the matching operation, an initial determination of the aircraft-type of aircraft 102 is made.

Referring still to FIG. 2, a passenger boarding bridge 200 including a nose-loader portion 202 and an over-the-wing (OTW) portion 204 is shown. The nose loader portion 202 ends at an aircraft-engaging cabin 206 and the OTW portion 204 ends at a pivotable cabin 208. Disposed proximate the aircraft-engaging end of the OTW portion 204, such as for instance within cabin 208, is a radio frequency identification (RFID) tag reader 116. The RFID tag reader 116 includes not illustrated antenna, transceiver and decoder components for receiving radio frequency (RF) signals that originate within an interrogation region 212 adjacent to the aircraft engaging end of the OTW portion 204. An RFID tag 120 is disposed aboard aircraft 102. The RFID tag 120 includes an integrated circuit for storing at least information relating to the aircraft-type of aircraft 102, and an antenna element for use in transmitting an RF signal that is encoded with the aircraft-type information. The RFID tag 120 preferably is disposed proximate the nose end of aircraft 102, such as for instance mounted to the cockpit windscreen or mounted to a surface of the nose landing-gear. Positioning the RFID tag 120 close to the nose of the aircraft 102 ensures that the RFID tag enters the interrogation region 212 as soon as possible during the aircraft approach to the aircraft stand. This allows the RFID tag 120 to be interrogated while the aircraft is as far away as possible from the stopping position. For the same reason, the RFID tag reader 116 is disposed within cabin 208 of the OTW portion 204, such that the interrogation region 212 is shifted as far away from the terminal building 104 as is possible. The specific configuration and operating principles of RFID systems are well known, and the details mostly are omitted from this discussion in the interest of clarity.

Of course, different types of RFID tags are known in the art. "Passive RFID tags" are radio frequency identification devices that do not have any internal power source. Their energy source is the power emitted from adjacent antennas such as for instance RFID tag reader 116. Passive tags have shorter read ranges than active tags (discussed below) and require a higher-powered reader. Read-only tags are typically passive and are programmed with a unique set of data (usually 32 to 128 bits) that cannot be modified. Semi-passive tags use a battery to run the chip's circuitry, but communicate by drawing power from the RFID tag reader. Active RFID tags are powered by an internal battery and are typically read/write, i.e., tag data can be rewritten and/or modified. An active tag's memory size varies according to application requirements; some systems operate with up to 1 MB of memory. The battery-supplied power of an active tag generally gives it a longer read range.

Passive RFID tags are currently approved for use on aircraft, provided that certain criteria are satisfied. In particular, the tags must operate in the "passive-only" mode. Currently, it is also required that the tags must not reflect back ambient RF energy of 35 decibels referenced to 1 microvolt per meter. This criterion must be satisfied to ensure that the tags do not pick up energy emitted by the engines or other devices, reflect it back and possibly interfere with aircraft systems. Furthermore, the frequency used by the tags must be outside the published aviation frequency bands to prevent interference with aircraft systems. The most common RFID frequencies— 2.45 GHz, 915 MHz and 13.56 MHz—do not overlap with any frequencies used in aviation and are acceptable for use with the systems and methods according to the instant invention. Finally, passive tags must be interrogated only on the ground when the aircraft is not in operation, and must function properly when installed and be designed "to operate in an aircraft operational environment with robust radio frequency stability." The methods according to the embodiments of the instant invention require interrogation of the tags while the aircraft is on the ground but still moving toward the aircraft stand. Accordingly, prior to implementing the methods that are described in the following paragraphs it may be necessary to confirm current regulatory requirements relating to operation of passive RFID tags on aircraft, and seek amendments thereto if necessary.

Active and semi-passive RFID tags currently are not approved for use on aircraft, but approval for their use is being sought at this time and it is reasonable to anticipate that such approval will be granted in the near future. Accordingly, in the discussion that follows it is assumed that the RFID tag 120 is a passive RFID tag and that the RFID tag reader 116 is of sufficiently high power to read a passive RFID tag that is disposed aboard an aircraft during approach of the aircraft to a stopping position within the aircraft stand. That said, the methods according to embodiments of the instant invention optionally are implemented using active RFID tags or semi-passive RFID tags where regulatory approval permits their use on an aircraft. It is to be understood that when active or semi-passive RFID tags are disposed aboard the aircraft, a suitable RFID tag reader is also provided.

The methods according to the various embodiments of the instant invention are readily implemented using existing VDGS systems of the type that are already installed in connection with either a manual or an automated passenger boarding bridge at an airport. Providing an RFID tag reader 116 in communication with the VDGS 100 is considered to be a necessary retrofit. Although the RFID tag reader 116 is shown disposed aboard the passenger boarding bridge, it is to be understood that optionally the RFID tag reader 116 is mounted to a surface of a terminal building or on a separate stand or structure. Positioning of the RFID tag reader 116 is done such that an interrogation region is defined along a path that is followed by aircraft during approach to the aircraft stand.

Figure 3:
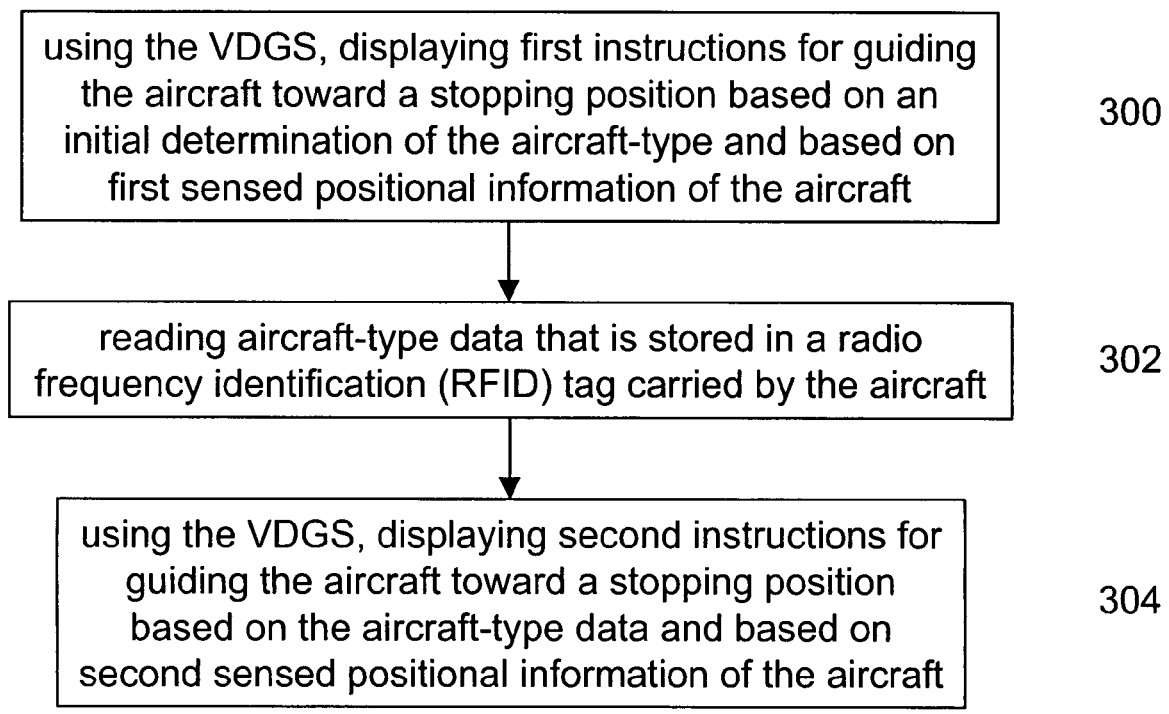
FIG. 3 is a simplified flow diagram for a method of guiding an aircraft toward a stopping position within an aircraft stand of an airport according to an embodiment of the instant invention.

Referring now to FIG. 3, shown is a simplified flow diagram for a method of guiding an aircraft toward a stopping position within an aircraft stand of an airport according to an embodiment of the instant invention. At step 300, the VDGS is used to display first instructions for guiding the aircraft toward a stopping position within the aircraft stand. The instructions are based on an initial determination of the aircraft-type, as well as first sensed positional information of the aircraft. Accordingly, an initial determination of the aircraft-type is made according to one of the approaches that are outlined supra. For the purpose of discussion, it is assumed that the initial determination of the aircraft-type is based on a comparison of data relating to sensed features of the aircraft with template data retrieved from a database of the airport. Of course, optionally the initial aircraft-type determination is based on aircraft gate assignment and aircraft type information that is retrieved from a database of the airport, or is based on information that a human operator provides via a data entry device. Once the initial aircraft-type determination is made, sensor 108 of the VDGS 100 is used to sense the current position of the aircraft 102. Instructions are determined for guiding the aircraft from the known current position of the aircraft to a predetermined stopping position for the aircraft-type as it was determined initially. The instructions are displayed, typically in the form of arrows, distance indicators, and alphanumeric commands or information displays, for instance using the display portion 106 of VDGS 100. As the aircraft 102 approaches the predetermined stopping position, RFID tag reader 116 is used at step 302 to interrogate RFID tag 120 carried by the aircraft, after RFID tag 120 moves into the interrogation region 118 or 212. In response to the interrogation, the RFID tag 120 returns a RF signal that is encoded with data relating to the actual aircraft-type. At step 304 the display portion 106 of VDGS 100 is used to display second instructions for guiding the aircraft toward a stopping position based on the aircraft-type data and based on second sensed positional information of the aircraft. When the aircraft-type data that is provided by the RFID tag 120 confirms correct initial aircraft-type determination, then the second instructions are updated instructions for guiding the aircraft from a new current position that is closer to the predetermined stopping position. The aircraft 102 continues generally along the same trajectory toward the same predetermined stopping position. However, when the aircraft-type data that is provided by the RFID tag 120 is indicative of incorrect initial aircraft-type determination, then the second instructions are updated instructions for guiding the aircraft 102 toward a new predetermined stopping position. In the latter case, it is assumed that the aircraft-type data relates to an aircraft having a predetermined stopping position that is different than the predetermined stopping position of the initially determined aircraft type. The aircraft 102, in response to the second instructions, begins to turn toward the new predetermined stopping position rather than continuing along a path that is inappropriate for the actual type of the aircraft 102. In order to provide sufficient time to adjust the trajectory of an aircraft when the initial determination of aircraft-type is incorrect, it is advantageous to position the RFID reader 116 further away from the terminal building, such as for instance near the aircraft-engaging end of a passenger boarding bridge, and preferably near the aircraft-engaging end of an over-the-wing portion of a passenger boarding bridge when present. Alternatively, RFID reader/RFID tag combinations that support communication over greater ranges are used.

Figure 4:
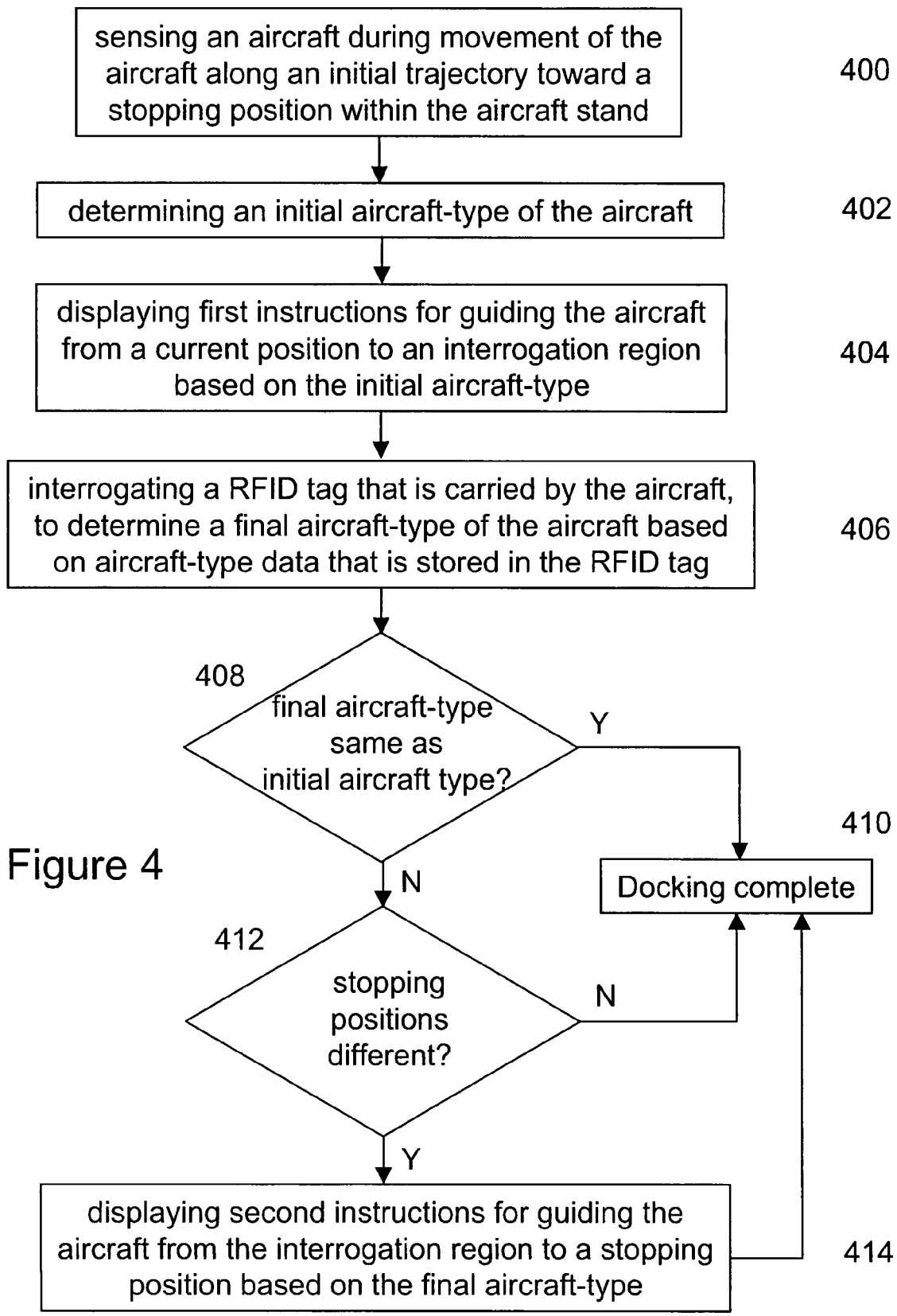
FIG. 4 is a simplified flow diagram for a method of guiding an aircraft toward a stopping position within an aircraft stand of an airport according to an embodiment of the instant invention; and, FIG. 5 is a simplified flow diagram for a method of guiding an aircraft toward a stopping position within an aircraft stand of an airport according to an embodiment of the instant invention.

Referring now to FIG. 4, shown is a simplified flow diagram for a method of guiding an aircraft toward a stopping position within an aircraft stand of an airport according to an embodiment of the instant invention. At step 400 an aircraft is sensed during movement of the aircraft along an initial trajectory toward a stopping position within the aircraft stand. For instance the sensor 108 of VDGS 100 is used to sense the aircraft, including sensing a current position of the aircraft. At step 402 an initial determination of the aircraft-type of the aircraft is made. For the purpose of discussion, it is assumed that the initial determination of the aircraft-type is based on a comparison of data relating to sensed features of the aircraft with template data retrieved from a database of the airport. Of course, optionally the initial aircraft-type determination is based on aircraft gate assignment and aircraft type information that is retrieved from a database of the airport, or is based on information that a human operator provides via a data entry device. At step 404 the display portion 106 of VDGS 100 is used to display first instructions for guiding the aircraft from a current position thereof to an interrogation region, the interrogation region being between the current position of the aircraft and a predetermined stopping position for the initial aircraft-type. At step 406, when the aircraft is within the interrogation region, a radio frequency identification (RFID) tag that is carried by the aircraft is interrogate, to determine a final aircraft-type of the aircraft based on aircraft-type data that is stored in the RFID tag. At decision step 408 it determined whether the final aircraft-type is the same as the initial aircraft type. If yes, then instructions continue to be displayed using the VDGS until aircraft docking is completed at step 410 and the aircraft comes to a stop at a predetermined stopping position for the initial type of the aircraft. If no, then at decision step 412 it is determined if a predetermined stopping position for the final aircraft-type is different than the predetermined stopping position for the initial aircraft-type. If no, then instructions continue to be displayed using the display portion 106 of VDGS 100 until aircraft docking is completed at step 410 and the aircraft comes to a stop at a predetermined stopping position for the initial type of the aircraft. If yes, at step 414 the display portion 106 of VDGS 100 is used to display second instructions for guiding the aircraft from the interrogation region to a predetermined stopping position for the final aircraft-type.

Figure 5:
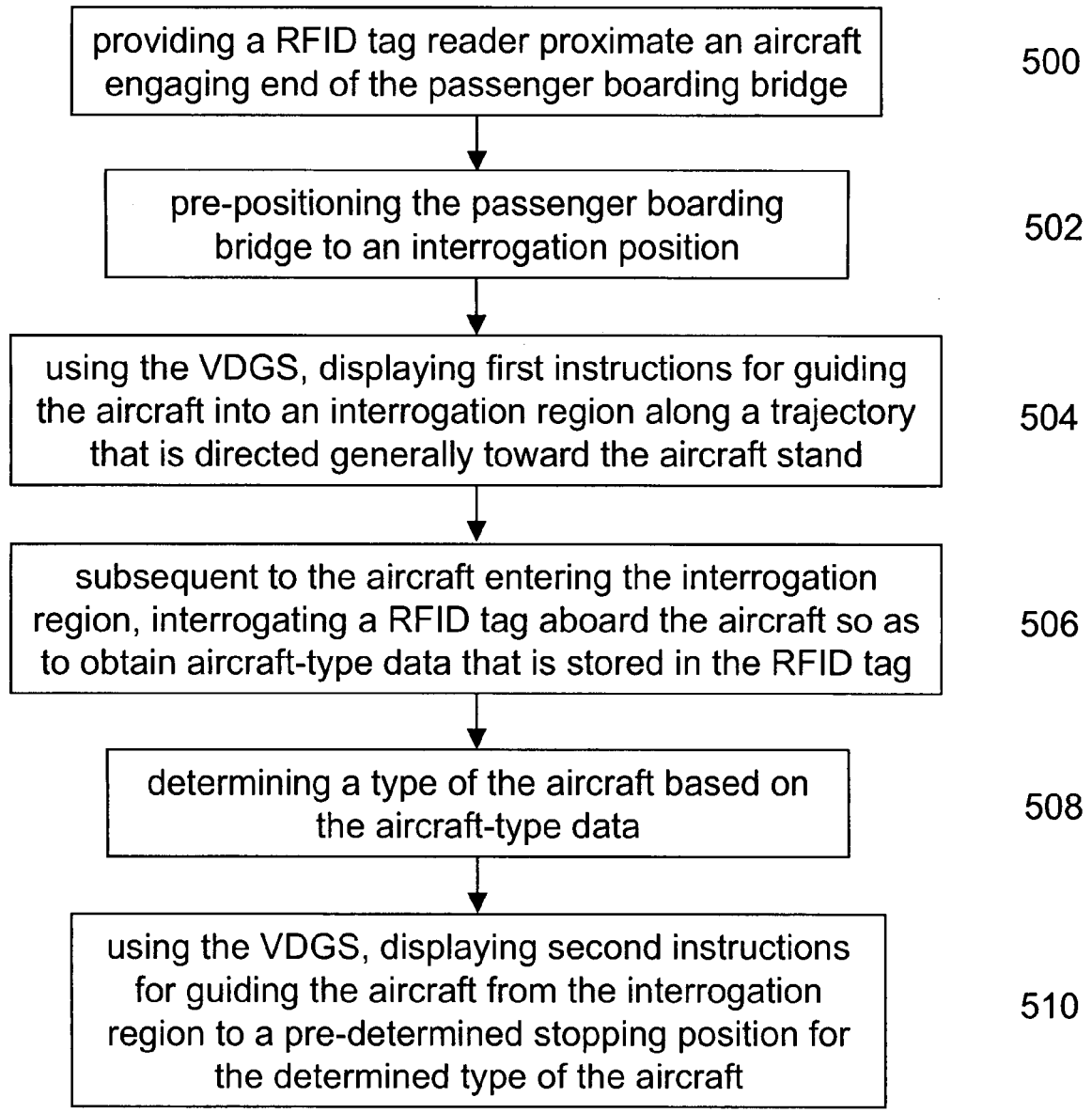

Referring now to FIG. 5, shown is a simplified flow diagram for a method of guiding an aircraft toward a stopping position within an aircraft stand of an airport according to an embodiment of the instant invention. At step 500 a radio frequency identification (RFID) tag reader is provided proximate an aircraft engaging end of the passenger boarding bridge. At step 502 the passenger boarding bridge is pre-positioned to an interrogation position, so as to define an interrogation region along a portion of an aircraft approach route to the stopping position. At step 504, using the display portion of VDGS 100, first instructions are displayed for guiding the aircraft into the interrogation region along a trajectory that is directed generally toward the aircraft stand. Subsequent to the aircraft entering the interrogation region, a RFID tag that is carried by the aircraft is interrogated at step 506 so as to obtain aircraft-type data that is stored in the RFID tag. At step 508 a type of the aircraft is determined based on the aircraft-type data. At step 510, using the display portion 106 of VDGS 100, second instructions are displayed for guiding the aircraft from the interrogation region to a predetermined stopping position for the determined type of the aircraft.

With reference to step 504, the trajectory that is directed generally toward the aircraft stand defines an initial aircraft approach path that is non-specific to aircraft type. In other words the aircraft is directed along a path that is selected to facilitate "last minute" changes when the RFID tag is interrogated and the aircraft-type is identified, at which time second instructions are displayed for diverting the aircraft toward the predetermined stopping position for the particular type of the aircraft. This approach is useful in cases where there is no aircraft identification system for making an initial determination of the aircraft-type, or when operating under conditions that render such an aircraft identification system either unreliable or non-functional. Optionally, the aircraft is identified simply as being one of a wide-body aircraft and a narrow-body aircraft, and with the trajectory being selected as the case may be for either a wide-body aircraft or a narrow-body aircraft.

Numerous other embodiments may be envisaged without departing from the spirit and scope of the invention.

What is claimed is:

1. A method for guiding an aircraft toward a stopping position within an aircraft stand of an airport, there being associated with the aircraft stand a passenger boarding bridge for supporting passenger loading and unloading operations and a visual docking guidance system (VDGS) for displaying instructions for guiding the aircraft toward a stopping position, the method comprising:

using the VDGS, displaying first instructions for guiding the aircraft toward a stopping position based on an initial determination of the aircraft-type and based on first sensed positional information of the aircraft;

reading aircraft-type data that is stored in a radio frequency identification (RFID) tag carried by the aircraft with a tag reader;

using the VDGS, displaying second instructions for guiding the aircraft toward a stopping position based on the aircraft-type data and based on second sensed positional information of the aircraft.

2. A method according to claim 1, wherein the initial identification of the aircraft-type is based on information that is retrieved from a database of the airport.

3. A method according to claim 1, wherein the initial identification of the aircraft-type is based on data relating to the type of the aircraft as provided by a human operator via a data entry device.

4. A method according to claim 1, wherein the initial identification of the aircraft-type is based on sensed data relating to the aircraft.

5. A method according to claim 1, wherein reading aircraft-type data that is stored in a RFID tag carried by the aircraft comprises interrogating the RFID tag using an RFID tag reader that is disposed at a location remote from the aircraft.

6. A method according to claim 5, wherein the RFID tag reader is disposed proximate an aircraft engaging end of the passenger boarding bridge, and comprising pre-positioning the passenger boarding bridge to an interrogation position prior to the RFID tag being interrogated.

7. A method according to claim 1, comprising providing the RFID tag aboard the aircraft.

8. A method according to claim 1, comprising stopping the aircraft at the stopping position in dependence upon the displayed second instructions.

9. A method for guiding an aircraft toward a stopping position within an aircraft stand of an airport, there being associated with the aircraft stand a passenger boarding bridge for supporting passenger loading and unloading operations and a visual docking guidance system (VDGS) for displaying instructions for guiding the aircraft toward a stopping position, the method comprising:
   sensing an aircraft during movement of the aircraft along an initial trajectory toward a stopping position within the aircraft stand;
   determining an initial aircraft-type of the aircraft;
   displaying with said VDGS first instructions for guiding the aircraft from a current position thereof to an interrogation region, the interrogation region being between the current position of the aircraft and a predetermined stopping position for the initial aircraft-type;
   when the aircraft is within the interrogation region, interrogating a radio frequency identification (RFID) tag that is carried by the aircraft with a tag reader, to determine a final aircraft-type of the aircraft based on aircraft-type data that is stored in the RFID tag; and,
   when the final aircraft-type is different than the initial aircraft type and a predetermined stopping position for the final aircraft-type is different than the predetermined stopping position for the initial aircraft-type, displaying with said VDGS second instructions for guiding the aircraft from the interrogation region to the predetermined stopping position for the final aircraft-type.

10. A method according to claim 9, wherein determining an initial aircraft-type of the aircraft comprises identifying a type of the aircraft based on a comparison of sensed features of the aircraft with template data relating to known aircraft types.

11. A method according to claim 9, wherein determining an initial aircraft-type of the aircraft comprises receiving aircraft-type data relating to the type of the aircraft as provided by a human operator via a data entry device.

12. A method according to claim 9, wherein determining an initial aircraft-type of the aircraft comprises retrieving from a database of the airport aircraft-type data relating to the aircraft.

13. A method according to claim 9, wherein interrogating the RFID tag is performed using an RFID tag reader that is disposed at a location remote from the aircraft.

14. A method according to claim 13, wherein the RFID tag reader is disposed proximate an aircraft engaging end of the passenger boarding bridge, and comprising pre-positioning the passenger boarding bridge to an interrogation position prior to the RFID tag being interrogated, so as to define the interrogation region.

15. A method according to claim 9, comprising providing the RFID tag aboard the aircraft.

16. A method according to claim 9, comprising stopping the aircraft at the predetermined stopping position for the final aircraft-type in dependence upon the displayed second instructions.

17. A method for guiding an aircraft toward a stopping position within an aircraft stand of an airport, there being associated with the aircraft stand a passenger boarding bridge for supporting passenger loading and unloading operations and a visual docking guidance system (VDGS) for displaying instructions for guiding the aircraft toward a stopping position, the method comprising:
   providing a radio frequency identification (RFID) tag reader proximate an aircraft engaging end of the passenger boarding bridge;
   pre-positioning the passenger boarding bridge to an interrogation position, so as to define an interrogation region along a portion of an aircraft approach route to the stopping position;
   determining an initial aircraft-type of the aircraft;
   using the VDGS, displaying first instructions for guiding the aircraft into the interrogation region along a trajectory that is directed generally toward the aircraft stand, the trajectory selected in dependence upon the determined initial aircraft-type of the aircraft;
   subsequent to the aircraft entering the interrogation region, interrogating a RFID tag that is carried by the aircraft with said reader so as to obtain aircraft-type data that is stored in the RFID tag;
   determining a final type of the aircraft based on the aircraft-type data; and,
   using the VDGS, displaying second instructions for guiding the aircraft from the interrogation region to a predetermined stopping position for the determined final type of the aircraft.

18. A method according to claim 17, wherein the trajectory that is directed generally toward the aircraft stand defines an initial aircraft approach path that is non-specific to aircraft type.

19. A method according to claim 17, comprising determining an initial aircraft-type of the aircraft, wherein the first instructions for guiding the aircraft into the interrogation region are selected for guiding the aircraft along a trajectory that is directed generally toward a predetermined stopping position for the initial aircraft-type, the predetermined stopping position defined within the aircraft stand.

20. A method according to claim 19, wherein the initial aircraft-type is indicative of a type and sub-type of the aircraft.

21. A method according to claim 19, wherein the initial aircraft-type is indicative of the aircraft being one of a wide-body aircraft and a narrow-body aircraft.

22. A method according to claim 19, wherein determining an initial aircraft-type of the aircraft comprises receiving aircraft-type data relating to the type of the aircraft as provided by a human operator via a data entry device.

23. A method according to claim 19, wherein designating an initial aircraft-type of the aircraft comprises retrieving from a database of the airport aircraft-type data relating to the aircraft.

24. A method according to claim 17, comprising providing the RFID tag aboard the aircraft.

* * * * *